US006977037B2

(12) United States Patent
Mioc

(10) Patent No.: US 6,977,037 B2
(45) Date of Patent: Dec. 20, 2005

(54) APPARATUS FOR USE IN RECLAIMING COOLANT USED IN CUTTING MACHINES

(76) Inventor: Alex Mioc, 2605 34th Street S.W., Calgary, Alberta (CA) T3E 2W6

( * ) Notice: Subject to any disclaimer, the term of this patent is extended or adjusted under 35 U.S.C. 154(b) by 57 days.

(21) Appl. No.: 10/715,615

(22) Filed: Nov. 19, 2003

(65) Prior Publication Data

US 2005/0103695 A1 May 19, 2005

(51) Int. Cl.$^7$ ................... B01D 29/05; B01D 29/13
(52) U.S. Cl. ................ 210/167; 210/232; 210/473; 210/477
(58) Field of Search ................. 210/167, 168, 210/232, 473, 477–481

(56) References Cited

U.S. PATENT DOCUMENTS

| 127,926 | A | * | 6/1872 | Scharff | ................ 210/313 |
|---|---|---|---|---|---|
| 443,246 | A | * | 12/1890 | Vecsey et al. | .............. 210/477 |
| 2,146,525 | A | * | 2/1939 | Boiano | ................ 210/477 |
| 2,902,161 | A | * | 9/1959 | Humbert, Jr. et al. | ... 210/416.5 |
| 3,400,824 | A | * | 9/1968 | Weimer et al. | .............. 210/238 |
| 4,052,163 | A | * | 10/1977 | Patzner | .............. 422/101 |
| 4,834,836 | A | * | 5/1989 | Wemhoff | .............. 159/23 |
| 4,976,850 | A | * | 12/1990 | Kulitz | .............. 210/104 |
| 5,390,944 | A | * | 2/1995 | Sherwin | .............. 280/47.35 |

* cited by examiner

Primary Examiner—Fred G. Prince

(57) ABSTRACT

An apparatus for reclaiming coolant used in cutting machines and for returning the reclaimed coolant to the coolant system of the cutting machine is provided. The apparatus includes a shallow receptacle for supporting a barrel that cuttings are deposited into during a milling operation of a work piece. The apparatus includes a flange that extends from an inner surface of the receptacle and supports the bottom of the barrel allowing coolant to drain from the barrel into the receptacle. The collected coolant is returned to the coolant system of the cutting machine by gravity via a drain line. The apparatus further includes a plurality of casters allowing the apparatus along with the supported barrel to be moved from location to location relatively easy.

9 Claims, 3 Drawing Sheets

APPARATUS FOR USE IN RECLAIMING COOLANT USED IN CUTTING MACHINES

BACKGROUND OF THE INVENTION

1. Field of the Invention

The present invention relates generally to coolant recovery systems for machine tools. More particularly, relating to an apparatus for more effectively reclaiming used coolant and returning the reclaimed coolant to a coolant supply tank for reuse.

2. Background of the Prior Art

It is known to use liquid coolants and lubricants during machining operations. The coolants and lubricants increase the performance of the machine tool and prevent overheating of the machine tool and the work piece. The coolants and lubricants also serve the purpose of flushing away cuttings from the machine tool and the work piece during the machining operation. With the expense of the coolants and the lubricants and their ecological effects on the environment it is not practical to dispose the coolant and lubricant after a single use. Accordingly, many prior art devices have been developed to recover used coolants and lubricants from the cuttings for continual usage. However, the prior art recovery devices and systems have been problematic and generally expensive to install, maintain and operate.

Therefore, a need exists for a new and improved apparatus for reclaiming coolant used in cutting machines that can be used to simultaneously recover used coolant and lubricant and return the coolant and lubricant back to the machine tool. In this regard, the present invention substantially fulfills this need. In this respect, the apparatus for reclaiming coolant used in cutting machines according to the present invention substantially departs from the conventional concepts and designs of the prior art, and in doing so provides an apparatus primarily developed for the purpose of simultaneously recovering used coolant and lubricant and returning the coolant and lubricant back to the machine tool.

SUMMARY OF THE INVENTION

In accordance with the present invention, an apparatus for reclaiming coolant used in cutting machines is provided. The apparatus in its most basic form is a wheeled cart having a shallow receptacle for supporting a barrel that cuttings are deposited into during a milling operation of a work piece. The apparatus includes a flange that extends radially from an inner surface of the receptacle and supports the barrel bottom of the barrel allowing coolant to drain from the barrel into the receptacle. The collected coolant is returned by to the coolant reservoir of the cutting machine by gravity via a drain line.

More particularly, the apparatus for use in a coolant reclaiming system to collect and return coolant to a coolant delivery system used in cutting machines, includes:
- a body that is hollow and generally cylindrically shaped, the body defined by an inner diameter, an outer diameter and includes a first end, a second end and a side-wall of a thickness equal to the difference of the inner diameter and the outer diameter, the side-wall having an inner surface and an outer surface;
- a shoulder, the shoulder formed integrally with the inner surface of the side-wall;
- a bottom connected to the inner surface of the side-wall between the first and second ends of said body; and
- a drain line connected to a drain port defined by the side-wall.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

An object of the present invention is to provide an apparatus for reclaiming coolant used in cutting machines for reclaiming a greater amount of coolant from cuttings, thereby providing for drier cuttings that can be more easily reclaimed and recycled.

Another object of the present invention is to provide an apparatus for reclaiming coolant used in cutting machines which reduces coolant loss resulting in decreased pollution and costs to purchase new coolant.

Still a further object of the present invention is to provide an apparatus for reclaiming coolant used in cutting machines which does not require motive means to return collected coolant back to the coolant system of a cutting machine.

Yet an additional object of the present invention is to provide an apparatus for reclaiming coolant used in cutting machines that is easily moved from location to location.

Further yet an additional object of the present invention is to provide an apparatus for reclaiming coolant used in cutting machines which continuously redirects reclaimed coolant to the coolant system of the cutting machine.

Yet another object of the present invention is to provide an apparatus for reclaiming coolant used in cutting machines which is easily used with existing coolant recovery system and does not require a lot of linear space.

Lastly, it is an object of the present invention to provide an apparatus for reclaiming coolant used in cutting machines and method of operating the same that has a low cost of manufacture with regard to both materials and labor, and which accordingly is then susceptible of low prices of sale to the consuming public, thereby making such valve assembly economically available to the buying public.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE INVENTION

Figure 1:
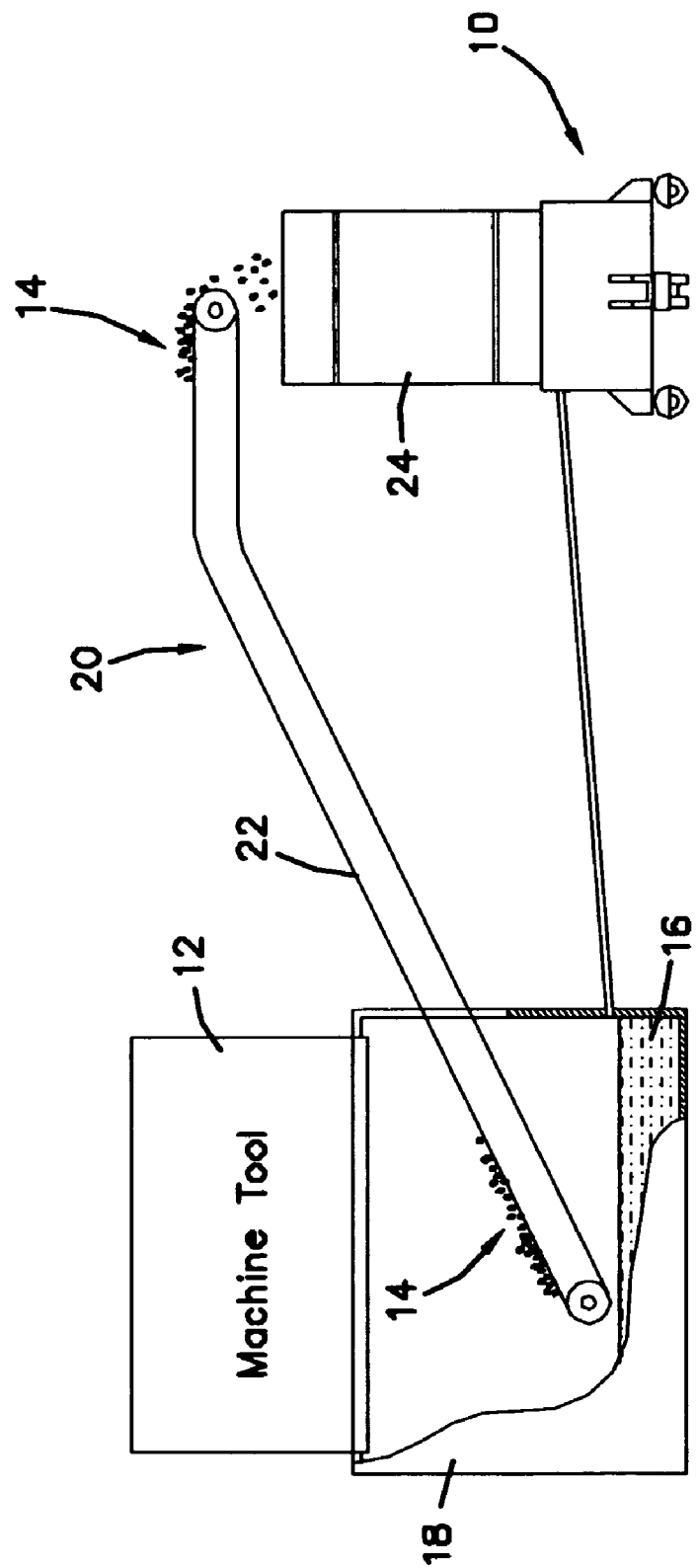
FIG. 1 is a schematic view of the preferred embodiment of the apparatus for reclaiming coolant used in cutting machines constructed in accordance with the principles of the present invention.
Figure 2:
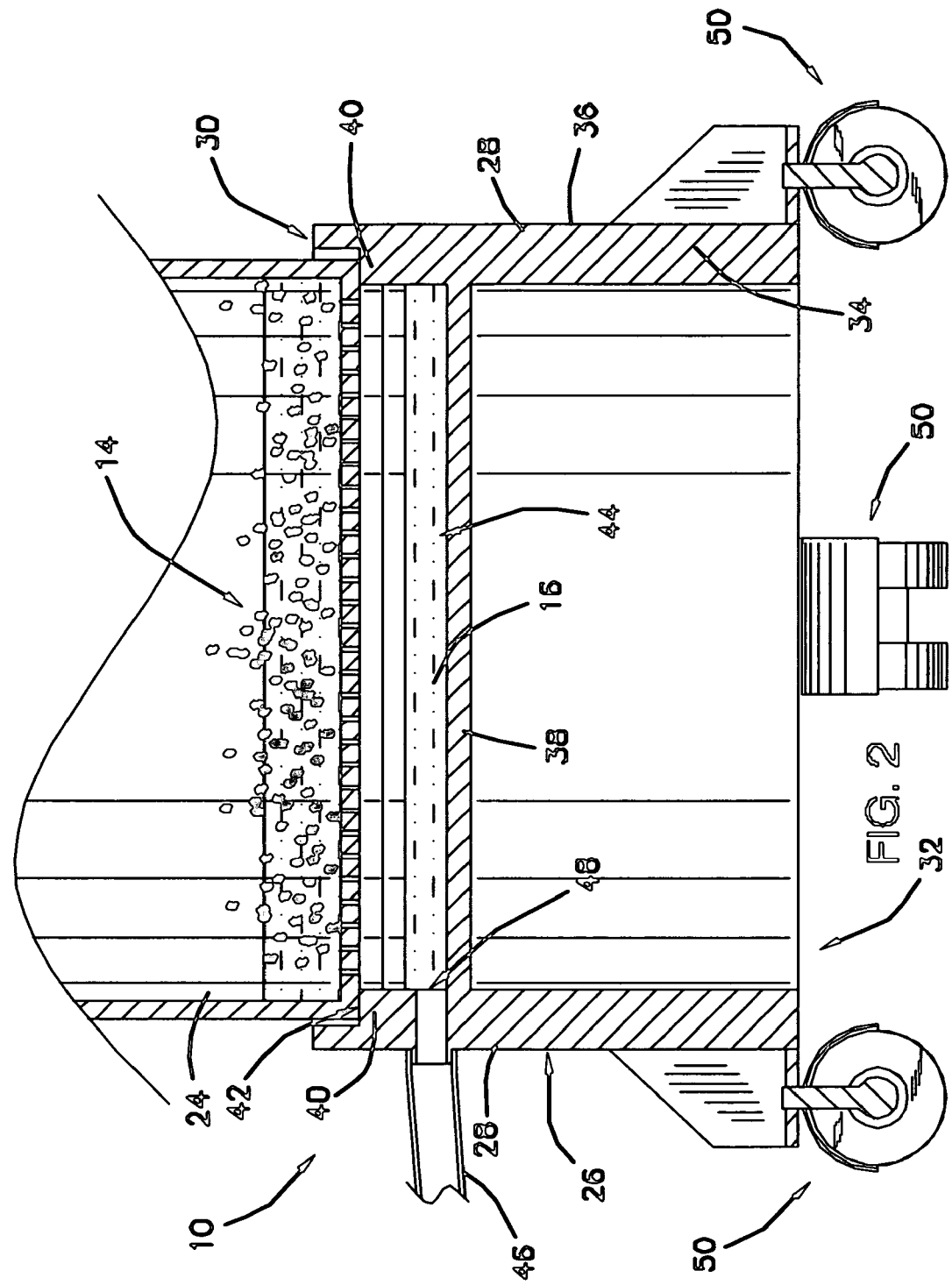
FIG. 2 is a cross sectional view of the apparatus for use in reclaiming coolant used in cutting machines of the present invention.
Figure 3:
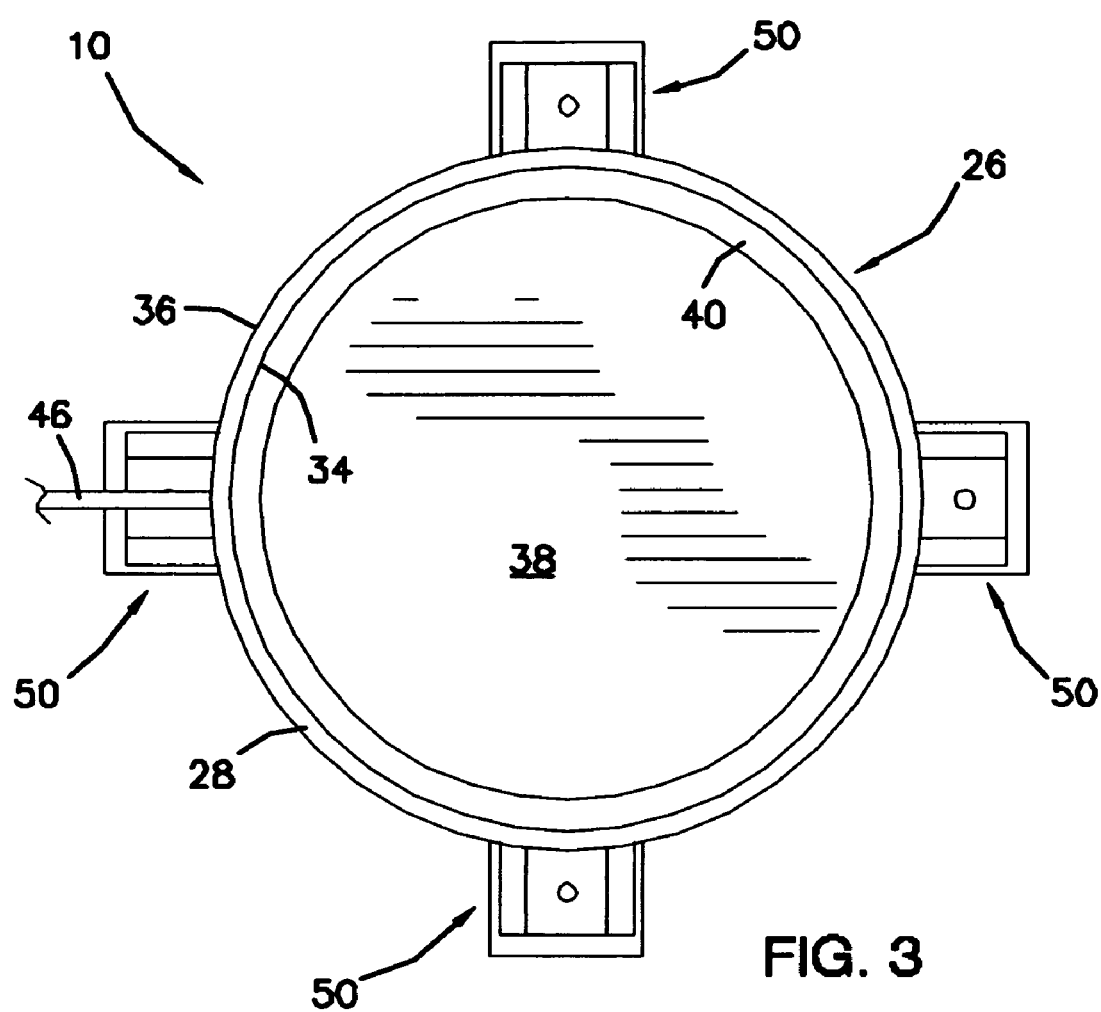
FIG. 3 is a top plan view of the apparatus for reclaiming coolant used in cutting machines of the present invention.

Referring now to the drawings, and particularly to FIGS. 1–3, a preferred embodiment of the apparatus for reclaiming coolant used in cutting machines of the present invention is shown and generally designated by the reference numeral 10.

In FIG. 1, a new and improved apparatus for use in reclaiming coolant used in cutting machines 10 of the present invention for reclaiming used coolant is illustrated and will be described. The apparatus 10 is illustrated in use schematically with a typical machine tool 12 for milling or otherwise cutting or removing discrete cuttings 14 from a work piece. During a machine operation, it is conventional to deliver a supply of liquid coolant 16 to a part of the machine tool or to the work piece being machined. The used or discharged coolant 16 accumulates in a collection reservoir 18, which is typically positioned below the machine tool 12. The cuttings 14 intermixed with the coolant 12 are intercepted from collecting in the reservoir 18 by a conveying system 20. The conveying system includes an endless belt 22 that can be porous allowing coolant to pass therethrough and collect in the reservoir 18. Cuttings 14 that are too large to pass through the belt 22 are transported away from the machine tool 12 and the reservoir 18 and deposited into a barrel 24 supported by the apparatus 10 of the present invention. The barrel 24 has a perforated bottom thereby allowing the coolant 16 to flow therethrough while retaining the cuttings 14 therein.

Referring to FIGS. 2 and 3, the apparatus 10 in its most basic form is a wheeled cart for supporting the barrel 24 that cuttings 14 are deposited into during a milling operation of a work piece. The apparatus supports the barrel 14 and collects coolant 16 that drains from the bottom of the barrel and returns the coolant back to the coolant reservoir 18. More particularly, the apparatus 10 comprises a hollow, cylindrical body 26 of an outer diameter and an inner diameter and two opposed ends 30 and 32. Preferably, the ends 30 and 32 are open. The body further includes a side-wall 28 extending between the two opposed ends 30 and 32, and having an inner surface 34 and an outer surface 36 and is of a thickness defined by the difference of the outer and the inner diameters of the body 26. The inner diameter of the body 26 is greater than the exterior diameter of the barrel 24, thereby allowing the barrel 24 to be received by the open end 30 of the body. Preferably, the inner diameter of the body 26 is slightly greater than the exterior diameter of the barrel 24 so as to have a tight tolerance between the inner surface 34 and the exterior surface of the barrel, thereby prevent the barrel from tipping out of the apparatus 10 when being supported or transported by the apparatus. The tolerance is close enough so that the bottom edge of the barrel 24 comes into contact with the inner surface 34 of the side-wall 28 when the barrel begins to tip, thereby stopping the barrel from tipping any further and retaining it to the apparatus 10.

The body 26 further includes a shoulder 40 of a first shoulder diameter that is greater than the inner diameter of the body 26 and of a second shoulder diameter that is equal to the inner diameter of the body. The shoulder 40 is integrally formed with the side-wall 28 and forms end 30 and is for supporting the barrel 24 thereon within the body 26. The first shoulder diameter is greater than the exterior diameter of the barrel 24 and the second shoulder diameter is less then the exterior diameter of the barrel. Preferably, the second shoulder diameter is slightly less than the diameter of the bottom edge 42 of the barrel.

A bottom 38 is integrally formed with the side-wall 28 between ends 30 and 32 of the body 26. Preferably, the bottom 38 is integrally formed with the side-wall 28 towards end 30, thereby forming a relatively shallow coolant collection receptacle 44. The apparatus 10 is not intended to collect a large volume of coolant 16. Rather, the intent of the present invention is to simultaneously collect the coolant 16 from the barrel 28 and return it back to the reservoir 18. In the preferred embodiment, the coolant 16 is gravity fed back to the reservoir 18, thereby eliminating the requirement of pumps or other mechanical means to transfer the coolant from the apparatus 10 to the coolant reservoir 18. Furthermore, the coolant 16 can be continuously returned to the reservoir 18 eliminating the need to stop the cutting machine for the purpose of dumping the cuttings 14 from the barrel and pouring the coolant 16 back into the reservoir 18.

The coolant 16 is returned to the reservoir by a coolant return line 46 that is connected to a drain port 48 that is formed through the side-wall 28 of the body 26 towards the bottom 38 thereof. Preferably, the drain port 48 is formed through the side-wall 28 so that the lower portion of the drain port is flush with the bottom 38.

To increase the mobility and usability of the apparatus 10, at least 3 caster wheels 50 are provided and are positioned along the outer surface 36 of the side-wall 28 towards the end 32 of the body 26. To increase stability of the apparatus 10, four caster wheels 50 are used and are equally spaced around the outer surface 36. Preferably, the caster wheels 50 are attached to the apparatus 10 at a spaced distance therefrom so the wheels make contact with the ground or a supporting surface along an arcuate path of a diameter greater than the outer diameter of the body 26.

In addition, the cuttings 14 retained by the barrel 24 serve as a type of filter to filter out impurities that are suspended in the coolant. Oil of a viscosity greater than the coolant 16 tends to stick to the cuttings 14 while the coolant of a lower viscosity flows more readily towards the bottom of the barrel 24 and then into the apparatus 10.

Also, to increase coolant recovery, multiple apparatuses 10 of the present invention may be used allowing barrels 24 once filled to a predetermined amount to be paced aside for additional time to maximize the volume of coolant 16 collected by the apparatus.

While a preferred embodiment of the Apparatus for reclaiming coolant used in cutting machines has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for use in a coolant reclaiming system to collect and return coolant to a coolant delivery system used in cutting machines, comprising:
   a body that is hollow and generally cylindrically shaped, said body of an inner diameter, an outer diameter and having a first end, a second end and a side-wall, the side-wall having an inner surface and an outer surface;
   a shoulder, said shoulder integrally formed with the inner surface of the side-wall at a spaced distance from the first end, said shoulder having a first shoulder diameter and a second shoulder diameter;
   a bottom connected to the inner surface of the side-wall between the first and second ends of said body towards the first end thereof;
   a drain line connected to a drain port formed through the side-wall;
   wherein the first and second ends are open and the first end for receiving a barrel of an exterior diameter that is greater then second shoulder diameter of said shoulder and said shoulder for supporting the barrel thereon; and
   further wherein the first shoulder diameter of said shoulder is slightly greater then the exterior diameter of the barrel so as to provide a tight tolerance between the inner surface of the side-wall and the outer surface of the barrel so a bottom edge of the barrel contacts the inner surface of the side-wall when the barrel begins to tip, thereby preventing the barrel from tipping over.

2. The apparatus of claim 1, further comprising:
   three casters attached to said body for supporting the apparatus upon a surface.

3. The apparatus of claim 1, wherein the lower edge of the drain port is flush with said bottom.

4. The apparatus of claim 1, wherein said coolant return line is positioned relative to the coolant delivery system such that coolant is returned to the coolant delivery system by gravity.

5. An apparatus for supporting a coolant collecting barrel forming part of a coolant reclaiming system and for receiving and returning coolant from the barrel to a coolant delivery system used in cutting machines, the apparatus comprising:
   a body having an opened first end, a second end and a side wall extending between said first and said second ends, said first end defining an integrally formed shoulder and is adapted to removably receive and support a bottom edge of the barrel;
   a bottom integrally formed with said side wall approximate said first end;
   said side wall and said bottom together defining a shallow receptacle for receiving coolant from the barrel through a bottom wall thereof; and
   a coolant return line attached to a drain port defined and formed through said side wall.

6. The apparatus of claim 5, further comprising:
   three casters attached to said body for supporting said apparatus upon a surface.

7. The apparatus of claim 5 wherein said drain port is defined and formed through said side wall such that a bottom edge of said drain port is flush with said bottom.

8. The apparatus of claim 5, wherein the diameter of said shoulder is slightly greater then an exterior diameter of the barrel so as to provide a tight tolerance between an inner surface of the side-wall and an outer surface of the barrel so the bottom edge of the barrel contacts the inner surface of the side-wall when the barrel begins to tip, thereby preventing the barrel from tipping over.

9. An apparatus for use in a coolant reclaiming system to collect and return coolant to a coolant delivery system used in cutting machines, comprising:
   a body that is hollow and generally cylindrically shaped, said body of an inner diameter, an outer diameter and having a first end, a second end and a side-wall, the side-wall having an inner surface and an outer surface;
   a shoulder, said shoulder integrally formed with the inner surface of the side-wall, said shoulder having a first shoulder diameter greater then the inner diameter of said body and a second shoulder diameter equal to the inner diameter of said body;
   a bottom connected to the inner surface of the side-wall between the first and second ends of said body towards the first end thereof;
   a drain line connected to a drain port formed through the side-wall, the drain port formed through the side-wall so that the lower edge of the drain port is flush with said bottom;
   at least 3 casters connected to said body at a spaced distance therefrom;
   said first and second ends are open and the first end for receiving a barrel of an exterior diameter that is less then the first shoulder diameter of said should and said shoulder supporting the barrel thereon; and
   wherein said first shoulder diameter of said shoulder is slightly greater then the exterior diameter of the barrel so as to provide a tight tolerance between the inner surface of the side-wall and the outer surface of the barrel so a bottom edge of the barrel contacts the inner surface of the side-wall when the barrel begins to tip, thereby preventing the barrel from tipping over.

* * * * *